Jan. 10, 1928.
C. C. ARRASMITH ET AL
1,656,132
VALVE
Filed Feb. 3, 1926
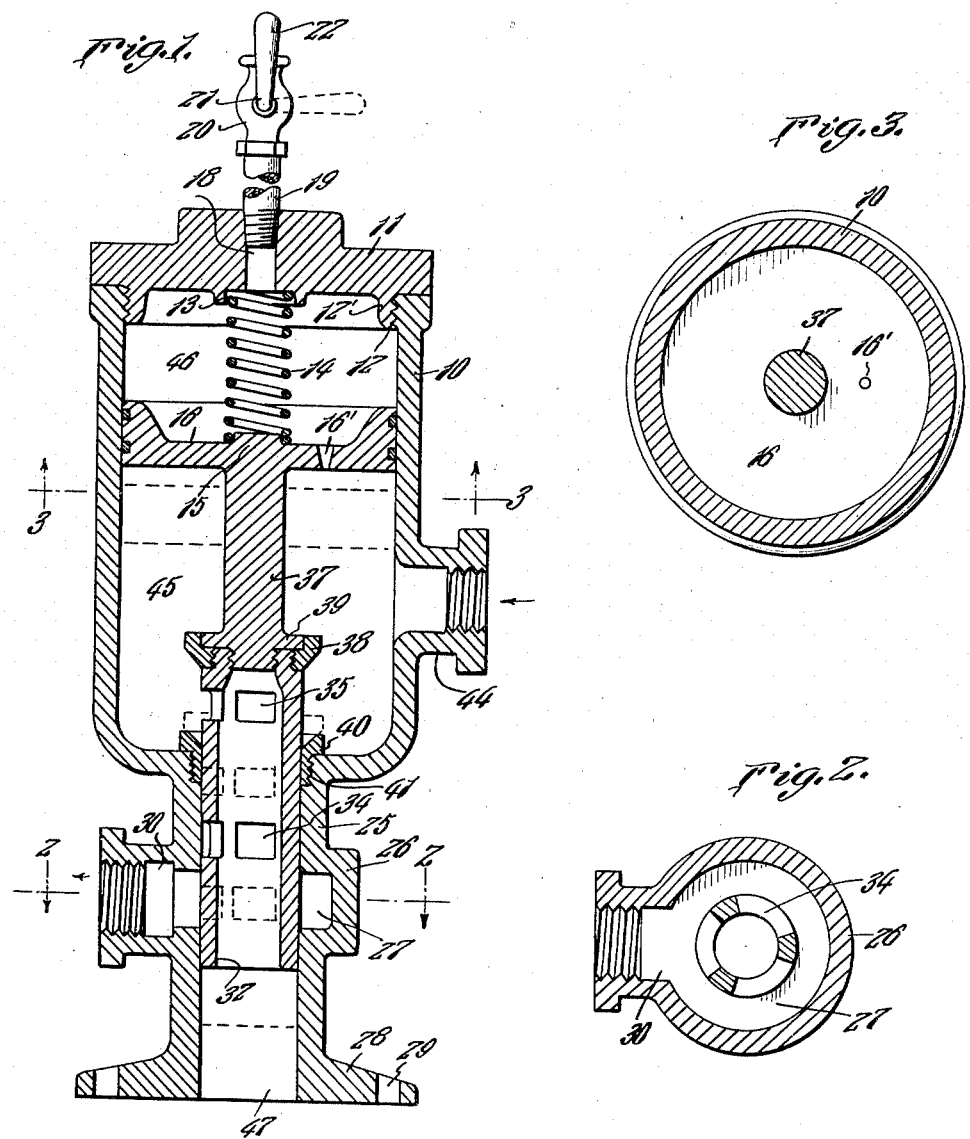
C.C. Arrasmith
H.D. Markwell
INVENTORS
BY Victor J. Evans
ATTORNEY Patented Jan. 10, 1928.

1,656,132

UNITED STATES PATENT OFFICE.

CLAUDE C. ARRASMITH AND HARRY D. MARKWELL, OF EDMONDS, WASHINGTON.

VALVE.

Application filed February 3, 1926. Serial No. 85,774.

The object of this invention is to place pressure on the fluid in a tank, pipe, or other receptacle or duct, and especially to place pressure on the tank of a sewage system aboard ship, for the purpose of disposing of waste water, below the load line of the vessel.

A further object is to provide a valve adapted for use in connection with gear shifting mechanism, hydraulic rams, and other devices employing liquid, gas, or other fluid pressure.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 shows the construction in vertical section.

Figure 2 is a transverse section on the line 2—2 of Figure 1.

Figure 3 is a transverse section on the line 3—3 of Figure 1.

Figure 4 shows a detachable valve seat, in vertical section.

The valve casing 10 is provided with a cap 11 having threaded connection at 12 with the inner portion of the upper end of the casing, a flange 12' being provided at the point indicated, so that an effective joint is produced. On the under side of the cap plate 11 is a boss 13 accommodating the upper end of a coiled spring 14, the latter cooperating with an element 15 carried by the upper portion of a piston 16. The piston fits within the casing 10, and is resiliently held with reference to movement in one direction, by spring 14.

Cap 11 is provided with a bore 18 receiving a pipe connection 19 communicating with the housing 20 of a plug cock 21, the latter being controlled by a handle 22, and operated manually, or otherwise, according to the circumstances existing in a particular case.

Casing 10 includes a lower extension 25 having an enlargement 26 provided with an inner annular channel 27, and extension 25 further includes a flange 28 provided with apertures 29, permitting the valve to be mounted in any suitable manner.

The extension 25 is also provided with an outlet member 30 communicating with the annular channel 27, for the purpose indicated below.

Within the extension 25, we mount a tubular element 33, having ports 34 therein, adapted to communicate with annular channel 27, in one position of element 32, and said element 32 is also provided with a series of upper ports 35.

Piston 16 carries a stem 37 having threaded connection with tubular element 32, and a separate valve element 38 has threaded connection with the upper end of element 32, and includes an external flange cooperating with the flange 39 on element 37.

The movable elements of the valve as a whole, are therefore practically formed in one piece, and the working face 38 of the valve may be replaced whenever required. A detachable valve seat is designated 40 and includes an upper flange and a reduced threaded portion 41 cooperating with a threaded portion in the upper part of extension 25, this valve seat also being renewable, when occasion requires.

Fluid enters casing 10 through connection 44, and assuming that piston 16 is down and valve 38 is seated at 40, fluid will pass through port 16' of piston 16, from chamber 45 to chamber 46, and upon opening cock 21, manually or otherwise, pressure will escape at this point, and because of the relatively small cross section of port 16' in the piston, pressure will be reduced in upper chamber 46, so that the pressure in chamber 45 will raise piston 16 and will raise valve 38, together with tubular valve member 32.

This operation opens upper ports 35 and closes lower ports 34, and fluid passes downwardly through tubular valve 32, and is discharged at 47.

When cock 21 is closed, spring 14 seats valve 38, and pressure is equalized above and below piston 16. Upper ports 35 are now closed and lower ports 34 are in communication with annular channel 27, and pressure is exhausted through port or connection 30 in order to relieve any pressure which may exist in a pipe line or the like, with which the discharge portion 47 may have connection.

What is claimed is:

1. In a device of the class described, a casing, a piston therein, the piston having a port, an inlet connection for the casing, below the piston, valved outlet connection for the casing above the piston, a tubular valve connected with the piston, the casing including a reduced extension providing a shoulder, a valve member carried by the upper portion of the tubular element, and adapted to seat at the shouldered portion of the casing, the tubular valve having upper and lower series of ports, and an outlet connection for the casing, below the shoulder, and adapted to register with the lower series of ports when the upper series of ports is below said shoulder and seat.

2. In a device of the class described, a casing, a ported piston therein, an inlet connection for the casing, below the piston, valved outlet connection for the casing above the piston, a spring interposed between the piston and the upper portion of the casing, a tubular valve connected with the piston, said casing including a reduced extension providing a shoulder, the tubular element projecting into said extension, a detachable valve member carried by the upper portion of the tubular element and adapted to seat at the shouldered portion of the casing, a detachable seat connected with the shouldered portion of the casing, the detachable elements cooperating, said tubular valve element having upper and lower series of ports, and an outlet connection for the casing, below the shouldered portion and adapted to register with the lower series of ports when the upper series of ports is below said shoulder and seat, said upper ports of the tubular member being open when the piston rises and when pressure is relieved above the piston, permitting fluid to pass from the casing through the tubular valve member for discharge through the lower end of the extension of said casing.

In testimony whereof we affix our signatures.

CLAUDE C. ARRASMITH.
HARRY D. MARKWELL.